(12) United States Patent
Yu et al.

(10) Patent No.: US 6,322,725 B1
(45) Date of Patent: Nov. 27, 2001

(54) LOW-VOLTAGE EXCITED BLUE PHOSPHOR AND METHOD OF PREPARING THE SAME

(75) Inventors: Il Yu, Suwon-si; Yong-Chan You, Seoul; Mi-ran Song, Suwon-si, all of (KR)

(73) Assignee: Samsung SDI Co., LTD, Kyungki-Do (KR)

( * ) Notice: Subject to any disclaimer, the term of this patent is extended or adjusted under 35 U.S.C. 154(b) by 0 days.

(21) Appl. No.: 09/519,894

(22) Filed: Mar. 6, 2000

(30) Foreign Application Priority Data

Mar. 10, 1999 (KR) .................................................. 99-7972

(51) Int. Cl.[7] .......................... C09K 11/62; C09K 11/54
(52) U.S. Cl. ........................................................ 252/301.6 R
(58) Field of Search ...................................... 252/301.6 R Primary Examiner—C. Melissa Koslow
(74) Attorney, Agent, or Firm—Christie, Parker & Hale, LLP

(57) ABSTRACT

A low-voltage excited blue phosphor is provided. The phosphor comprises a matrix represented by general formula $ZnO \cdot Ga_2O_3$, and Bi doped in the matrix. To prepare the phosphor, ZnO, $Ga_2O_3$, Bi compound, and a flux are mixed to produce a mixture, and the mixture is fired at 1100–1300° C. to produce a fired material. Then the fired material is milled, and washed with an acid. The washed material is fired at 800–1100° C. and sieved to produce the blue phosphor.

5 Claims, 2 Drawing Sheets

LOW-VOLTAGE EXCITED BLUE PHOSPHOR AND METHOD OF PREPARING THE SAME

CROSS REFERENCE TO RELATED APPLICATION

This application claims priority to Korean patent application No. 99-7972, filed on Mar. 10, 1999, the content of which is incorporated herein by reference.

FIELD OF THE INVENTION

The present invention relates to a low-voltage excited phosphor. More particularly, this invention relates to a low-voltage excited blue phosphor of high brightness and a method of preparing the same.

BACKGROUND OF THE INVENTION

In low-voltage driving display devices, such as vacuum fluorescent display devices, field emission display devices, or the like, ZnS:Zn phosphor is generally used as a blue phosphor. The brightness of ZnS:Zn phosphor is generally high, but it has a relatively short life-time. Therefore, oxide compounds, which have relatively low initial brightness but long life-times and good brightness-maintaining properties, have been recently developed for use as a blue phosphor. Among the oxide compounds, zinc gallate phosphor is known to have high brightness, and it is known to radiate a stable blue ray. Zinc gallate phosphor is also capable of radiating visible ray without an activator.

FIG. 2 shows the method of preparing the conventional zinc gallate phosphor. As shown in FIG. 2, ZnO, $Ga_2O_3$, and $Li_3PO_4$ as a flux are mixed and fired for 3 hours at 1200° C. under air atmosphere. After the firing step, the fired matrix is milled, preferably by ball-milling to uniformly disperse the matrix. Then to remove excess $Li_3PO_4$, the dispersed matrix is washed with nitric acid. The washed matrix is subjected to secondary firing for 1–3 hours at 1100° C. under a reduced atmosphere and sieved to produce a low-voltage excited blue phosphor. However, the brightness of this zinc gallate phosphor is low, and a phosphor of high brightness is still required in the industry.

SUMMARY OF THE INVENTION

Accordingly, it is an object of the present invention to provide a low-voltage excited blue phosphor of high brightness. It is another object of the present invention to provide a method of preparing the low-voltage excited blue phosphor of high brightness.

In order to achieve these and other objects, the present invention provides a low-voltage excited blue phosphor comprising a $ZnO.Ga_2O_3$ matrix and Bi doped in the matrix as an activator. The present invention also provides a method of preparing a low-voltage excited blue phosphor comprising the steps of mixing ZnO, $Ga_2O_3$, a Bi compound, and a flux to produce a mixture, and firing the mixture at 1100–1300° C. to produce a fired material. The fired material is milled and washed with an acid. The washed material is then subjected to secondary firing at 800–1100° C. and sieved to produce the blue phosphor of the present invention.

BRIEF DESCRIPTION OF THE DRAWINGS

A more complete appreciation of the invention, and many of the attendant advantages thereof, will be better understood by reference to the following detailed description when considered in conjunction with the accompanying drawings, wherein.

DETAILED DESCRIPTION OF THE INVENTION

For a better understanding of the present invention, reference will now be made in detail to the following disclosures.

In an embodiment of the present invention, the low-voltage excited blue phosphor comprises a $ZnO.Ga_2O_3$ matrix and Bi doped in the matrix. The process of preparing the low-voltage excited blue phosphor is as follows.

Figure 1:
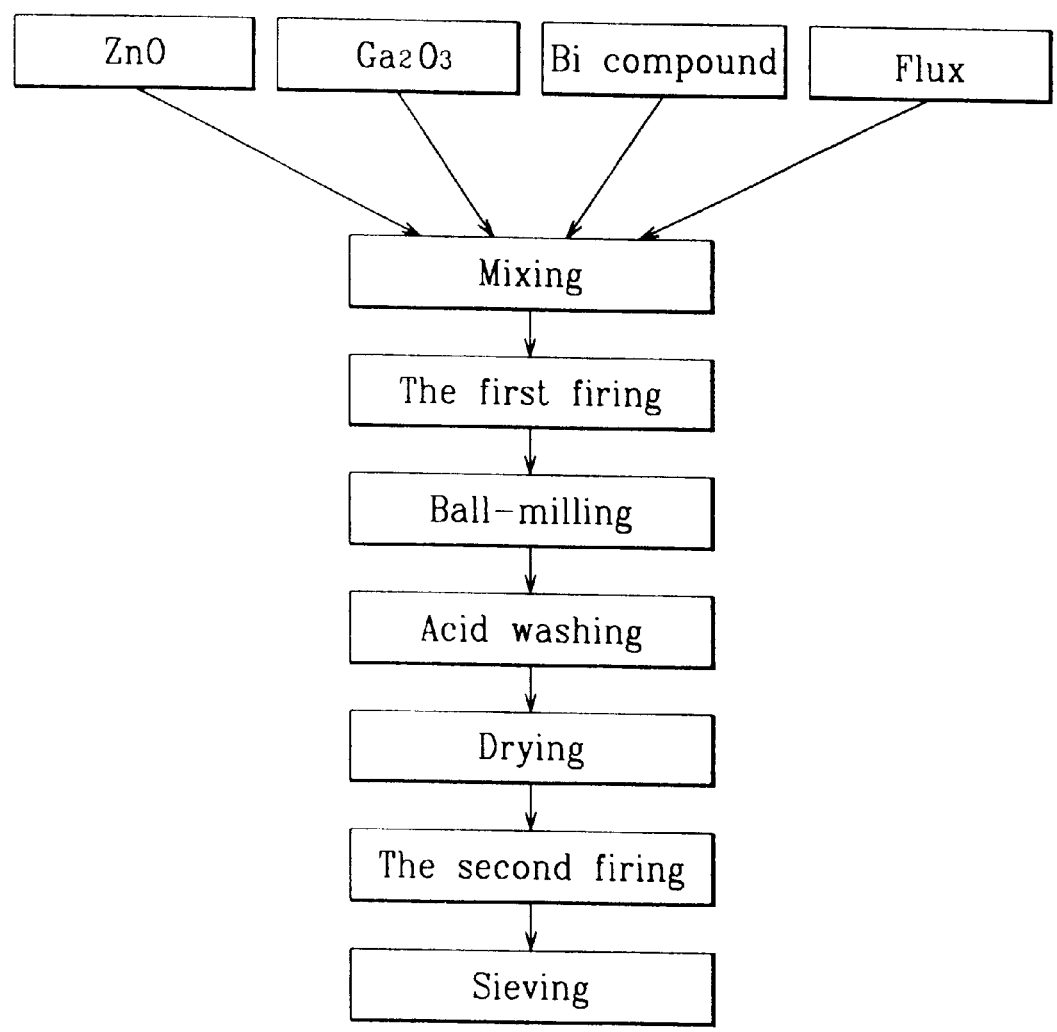
FIG. 1 is a flow chart showing the process of preparing the low-voltage excited blue phosphor according to an embodiment of the present invention.
Figure 2:
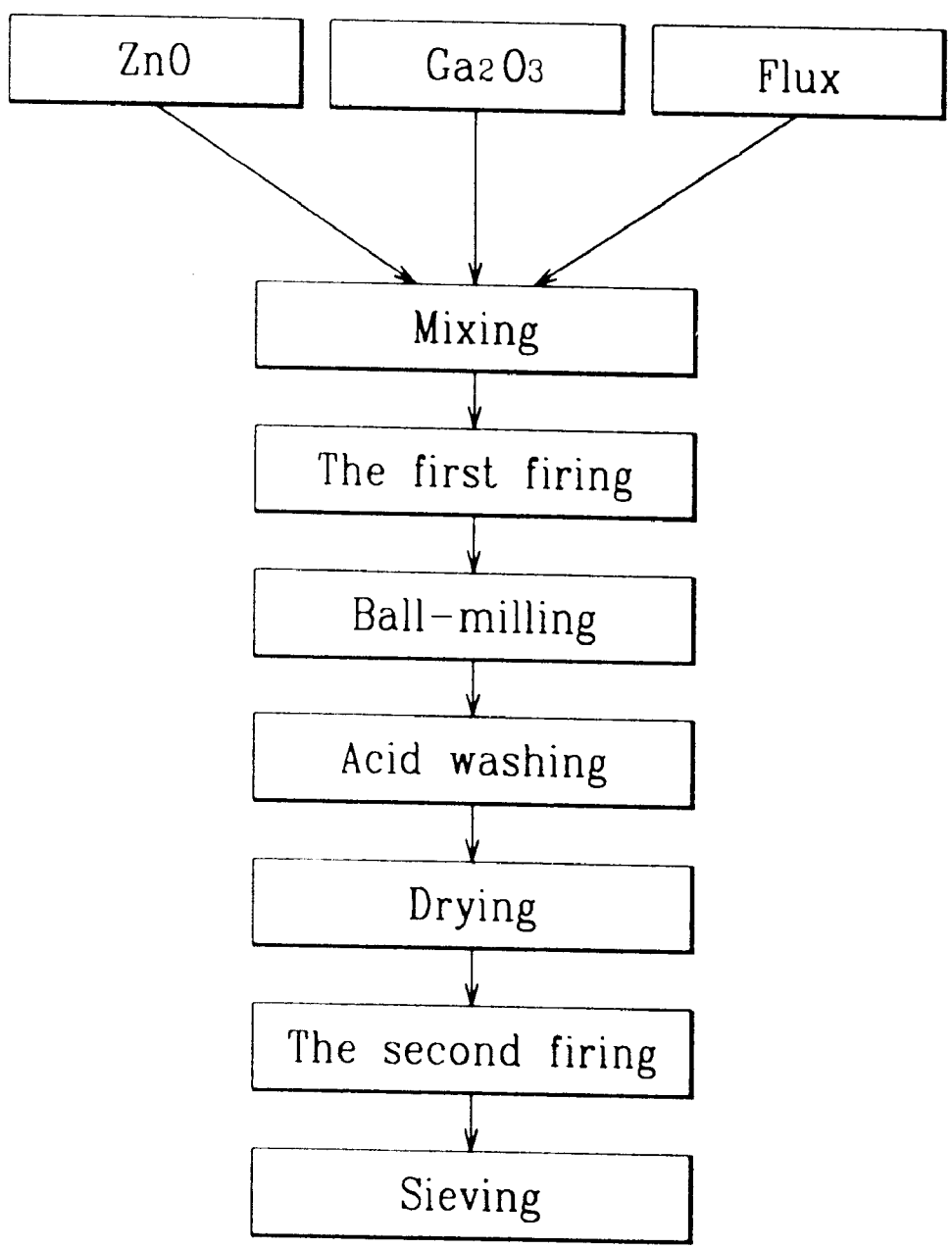
FIG. 2 is a flow chart showing the conventional process of preparing a low-voltage excited blue phosphor.

Referring to FIG. 1, the first step of preparing the low-voltage excited blue phosphor is mixing ZnO, $Ga_2O_3$, a Bi compound, and a flux. ZnO and $Ga_2O_3$ are preferably mixed with each other in equimolar amounts. Examples of preferred Bi compounds are $Bi_2O_3$ and $BiCl_3$. The preferable amount of the Bi compound is 0.001 to 0.1 mol per 1 mol of $ZnO.Ga_2O_3$ matrix or per 1 mol of ZnO.

The resultant mixture is fired at a temperature range ranging from 1100 to 1300° C. This firing step is preferably carried out for about 3 hours at 1200° C. under air atmosphere. By the firing step, a $ZnO.Ga_2O_3$ matrix in which $Bi^{3+}$ is dispersed is formed.

Then, the fired material is milled to disperse agglomerated particles of the matrix and allow for uniform particle sizes in the matrix. This milling is preferably carried out by ball-milling the matrix for about 3 hours. The milled material is subsequently washed with an acid, such as 0.5 N nitric acid or 1% hydrogen chloride solution, to remove the excess flux.

The washed material is subjected to a secondary firing step at 800 to 1100° C., preferably for 2 hours at 1100° C. The secondary firing step is preferably carried out under an oxygen-deficient or reduced atmosphere to facilitate the reduction of the fired material. During this firing step, the crystallinity of the zinc gallate matrix is improved, and the blue ray radiation efficiency of the phosphor is increased. Before the second firing step, the washed material may be optionally dried. The fired material is then sieved to produce the phosphor of the present invention.

The resultant low-voltage excited blue phosphor has CIE color coordinates of x=0.20 ±0.05, and y=0.25 ±0.05, and it comprises a $ZnO.Ga_2O_3$ matrix and Bi doped in the matrix as an activator. The Bi which is doped in the matrix exists in the form of $Bi^{3+}$ ion, and radiates a blue ray due to its $^3P_1 \rightarrow {}^1S$ transition at room temperature. Since the optical energy band gap of $ZnGa_2O_4$ is 4.4 eV, the phosphor radiates a blue ray due to not only the radiation of $ZnGa_2O_4$ but also the radiation of $Bi^{3+}$.

The intensity of the blue ray emitted from the phosphor according to the present invention depends on the concentration of $Bi^{3+}$ ion which induces the $^3P_1 \rightarrow {}^1S$ transition. Thus, the intensity of the blue ray is maximized when the blue-ray radiation of $ZnGa_2O_4$ and the blue-ray radiation of $Bi^{3+}$ ion occur concurrently.

In order to more fully illustrate the preferred embodiments of the present invention, the following detailed examples are given.

EXAMPLE 1

First, 1 mol of ZnO, 1 mol of $Ga_2O_3$, an excess amount of $Li_3PO_4$, and 0.001 mol of $Bi_2O_3$ are mixed and fired for 3 hours at 1200° C. under air atmosphere. Then the fired material is ball-milled for 3 hours and washed with 0.5 N nitric acid. The washed material is fired for 2 hours at 1100° C. under a reduced atmosphere. The residual aggregated particles and other large particles in the fired material are eliminated by sieving to produce the blue phosphor of the present invention.

EXAMPLE 2

The same procedure in Example 1 is repeated to produce the blue phosphor of the present invention, except using 0.005 mol of $Bi_2O_3$.

EXAMPLE 3

The same procedure in Example 1 is repeated to produce the blue phosphor of the present invention, except using 0.01 mol of $Bi_2O_3$.

Vacuum fluorescent display devices are manufactured with the phosphors of Examples 1 to 3 and conventional $ZnGa_2O_4$ phosphor. Vacuum fluorescent display devices were driven with 50 V driving voltage, and the relative brightness of each phosphor is measured. These measurements are shown below in Table 1.

TABLE 1

|  | relative brightness | Amount of Bi compound (mol) |
|---|---|---|
| Example 1 | 104% | 0.001 |
| Example 2 | 108% | 0.005 |
| Example 3 | 115% | 0.01 |
| conventional $ZnGa_2O_4$ phosphor | 100% | 0 |

As shown in Table 1, the brightness of the blue phosphor of the present invention increases by about 15% compared to that of the conventional blue phosphor. Thus the blue phosphor described in the present invention shows superior light emitting efficiency.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A low-voltage excited blue phosphor comprising:

a matrix represented by general formula $ZnO.Ga_2O_3$; and

Bi doped in the matrix.

2. The low-voltage excited blue phosphor according to claim 1, wherein the blue phosphor has CIE color coordinates of x=0.20±0.05, and y=0.25 ±0.05.

3. A method of preparing a low-voltage excited blue phosphor comprising the steps of:

mixing ZnO, $Ga_2O_3$, a Bi compound, and a flux to produce a mixture;

firing the mixture at a temperature ranging from 1100 to 1300° C. to produce a first fired material;

milling the first fired material to produce a milled material;

washing the milled material with an acid to produce a washed material;

firing the washed material at a temperature ranging from 800 to 1100° C. to produce a second fired material; and sieving the second fired material.

4. The method according to claim 3 wherein the Bi compound is selected from the group consisting of $Bi_2O_3$ and $BiCl_3$.

5. The method according to claim 3 wherein the Bi compound is present in an amount ranging from 0.001 to 0.1 mol per 1 mol of ZnO.

* * * * *